United States Patent
Liu

(10) Patent No.: US 11,679,559 B2
(45) Date of Patent: Jun. 20, 2023

(54) THREE-DIMENSIONAL PRINTING APPARATUS AND MANUFACTURING METHOD THEREOF

(71) Applicant: Young Optics Inc., Hsinchu (TW)

(72) Inventor: Tsung Yu Liu, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 67 days.

(21) Appl. No.: 16/827,712

(22) Filed: Mar. 24, 2020

(65) Prior Publication Data
US 2021/0299960 A1 Sep. 30, 2021

(51) Int. Cl.
*B29C 64/364* (2017.01)
*B33Y 30/00* (2015.01)
*B29C 64/264* (2017.01)
*B29C 64/135* (2017.01)

(52) U.S. Cl.
CPC .......... *B29C 64/364* (2017.08); *B29C 64/135* (2017.08); *B29C 64/264* (2017.08); *B33Y 30/00* (2014.12)

(58) Field of Classification Search
CPC ..... B33Y 30/00; B29C 64/135; B29C 64/264; B29C 64/364
See application file for complete search history.

(56) References Cited

U.S. PATENT DOCUMENTS

| | | | |
|---|---|---|---|
| 2019/0111622 A1* | 4/2019 | Khalip | B29C 64/268 |
| 2019/0160733 A1* | 5/2019 | Mirkin | B29C 67/24 |
| 2019/0227445 A1* | 7/2019 | Van Der Meulen | G03F 7/70875 |
| 2020/0055251 A1* | 2/2020 | Medalsy | B29C 64/357 |
| 2020/0338826 A1* | 10/2020 | Park | B33Y 50/02 |
| 2021/0178698 A1* | 6/2021 | Sakamaki | B33Y 10/00 |
| 2022/0176623 A1* | 6/2022 | Batchelder | B33Y 10/00 |
| 2022/0193988 A1* | 6/2022 | Walker | B33Y 10/00 |

* cited by examiner

*Primary Examiner* — Deoram Persaud
(74) *Attorney, Agent, or Firm* — JCIPRNET

(57) ABSTRACT

A three-dimensional printing apparatus includes a tank, a transparent plate, a printing platform, a projector and a heat dissipation assembly. The tank accommodates a photocurable material, and the transparent plate is disposed adjacent to the tank. The printing platform and the projector are respectively disposed on opposite sides of the transparent plate. The heat dissipation assembly is disposed adjacent to the tank.

9 Claims, 5 Drawing Sheets

THREE-DIMENSIONAL PRINTING APPARATUS AND MANUFACTURING METHOD THEREOF

BACKGROUND OF THE INVENTION

1. Field of the Invention

The disclosure relates to a printing apparatus and a manufacturing method thereof, and more particularly, to a three-dimensional printing apparatus and a manufacturing method thereof.

2. Description of Related Art

In current three-dimensional printing technologies, a bottom-up stereo lithography apparatus (bottom-up SLA) has been developed. The bottom-up SLA can make fine finished-products. When the bottom-up SLA performs printing, a printing platform goes down to be completely immersed in a photocurable material. Then the photocurable material is irradiated to be cured, and the printing platform slowly goes up to form a plurality of layers of mutually-stacked solid-state patterns on a bottom surface of the printing platform, thereby completing a finished-product of printing. However, the photocurable material described above is usually a soft material, and insufficient structural rigidity and strength thereof cause a printed object to be deformed or cracked, thereby affecting fineness and a success rate of the finished-product.

SUMMARY OF THE INVENTION

The disclosure provides a three-dimensional printing apparatus and a manufacturing method thereof. The three-dimensional printing apparatus may directly or indirectly decrease a temperature of a printed object, so that the printed object temporarily obtains relatively high structural rigidity and strength, thereby improving a success rate and fineness of a product.

A three-dimensional printing apparatus in an embodiment of the disclosure includes a tank, a transparent plate, a printing platform, a projector and a heat dissipation assembly. The tank accommodates a photocurable material, and the transparent plate is disposed adjacent to the tank. The printing platform is disposed on one side of the transparent plate, and the projector is disposed on the other side of the transparent plate. The heat dissipation assembly is disposed adjacent to the tank.

A three-dimensional printing apparatus in another embodiment of the disclosure includes a tank, a transparent plate, a printing platform, a projector and a heat dissipation assembly. The tank accommodates a photocurable material, and the transparent plate is disposed adjacent to the tank. The printing platform is disposed on one side of the transparent plate, and the projector is disposed on the other side of the transparent plate. The heat dissipation assembly is disposed on the printing platform.

A manufacturing method of a three-dimensional printing apparatus in another embodiment of the disclosure includes the following steps: providing an tank to accommodate a photocurable material; disposing a transparent plate adjacent to the tank; disposing a printing platform on one side of the transparent plate; disposing a projector on the other side of the transparent plate; and disposing a heat dissipation assembly adjacent to the tank.

Based on the above, in the design of the three-dimensional printing apparatus in the embodiments of the disclosure, a heat dissipation assembly is adjacent to an tank, and may directly or indirectly decrease a temperature of a printed object, so that structural rigidity and strength of the printed object may be temporarily improved to withstand stress generated during a printing process, thereby improving a success rate and fineness of a product.

To make the foregoing features and advantages of the disclosure more comprehensible, a detailed description is made below with reference to the accompanying drawings by using embodiments.

DESCRIPTION OF THE EMBODIMENTS

Figure 1:
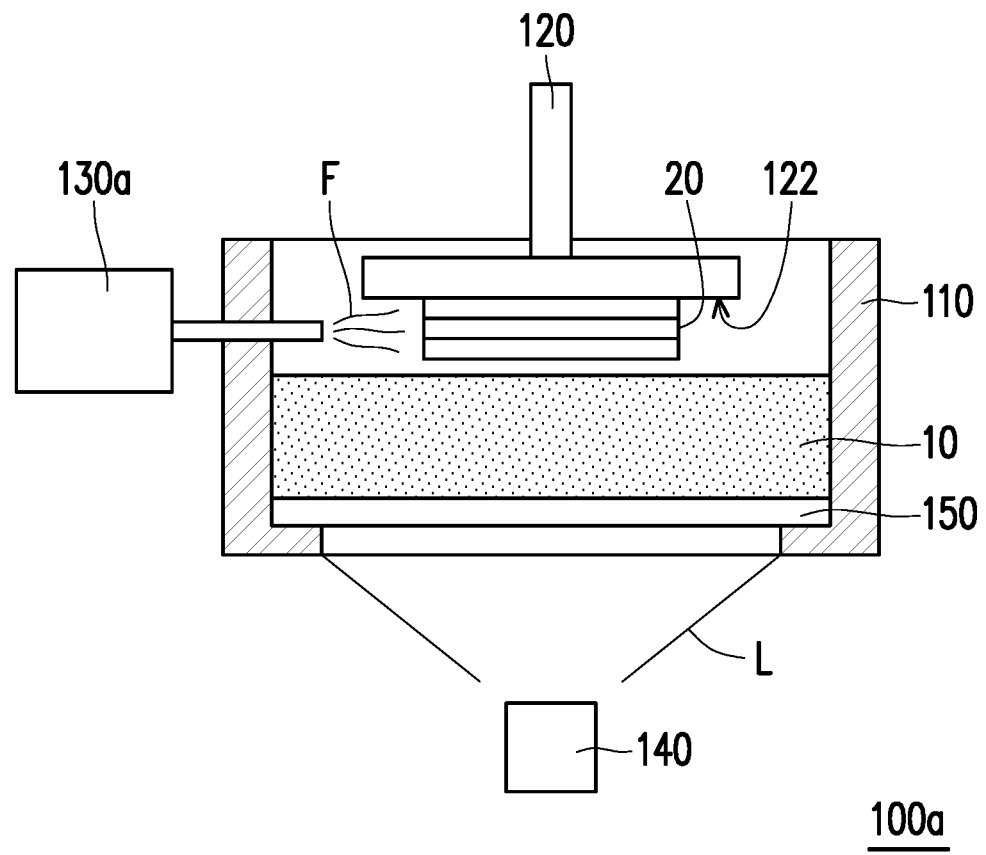
FIG. 1 is a schematic diagram of a three-dimensional printing apparatus according to an embodiment of the disclosure.

FIG. 1 is a schematic diagram of a three-dimensional printing apparatus according to an embodiment of the disclosure. Referring to FIG. 1, in the present embodiment, the three-dimensional printing apparatus 100a includes a tank 110, a transparent plate 150, a printing platform 120, a heat dissipation assembly 130a, and a projector 140. The tank 110 accommodates a photocurable material 10, and the transparent plate 150 is disposed inside the tank 110. In an embodiment, the transparent plate 150 is disposed adjacent to the tank 110, but outside the tank 110. In an embodiment, the tank 110 directly has the transparent plate 150 as a bottom portion. The printing platform 120 is disposed on one side of the transparent plate 150, and is adapted for moving toward a direction away from or close to the tank 110. The projector 140 is disposed on the other side of the transparent plate 150, and is adapted for providing a curing light beam L to irradiate the photocurable material 10, so that the photocurable material 10 is cured to be a printed object 20 on a working surface 122 of the printing platform 120. The heat dissipation assembly 130a is disposed adjacent to the tank 110 to decrease a temperature of the printed object 20.

More specifically, the tank 110 in the present embodiment is configured to accommodate the photocurable material 10 in different forms such as a liquid state, a colloidal state, or powder, but is not limited thereto. Because of a material attribute, after being irradiated and cured, the photocurable material 10 may be formed on the working surface 122 of the printing platform 120 in a layer-by-layer manner to form the printed object 20. Particularly, the heat dissipation assembly 130a in the present embodiment, for example, is a wind pipe, and is adapted for providing a cooling fluid F to the printed object 20 to decrease the temperature of the printed object 20, so that the soft printed object 20 may temporarily obtain relatively high mechanical strength to withstand stress generated during a printing process. Herein, the cooling fluid F may be, for example, cold air, but is not limited thereto.

Moreover, the printing platform 120 and the projector 140 in the present embodiment are respectively located on an upper side and a lower side of the tank 110. The projector 140 may be, for example, a digital light processing (DLP) projection assembly, a liquid-crystal-on-silicon (LCOS) projection assembly, a liquid crystal projection assembly, or a scanning-type laser projection assembly. A light-emitting assembly used by the projector 140 may be a light emitting diode (LED), a laser, or other applicable light-emitting assemblies. It should be noted that a wavelength range of light provided by the light-emitting assembly needs to fit the photocurable material 10.

In addition, the transparent plate 150 in the present embodiment is located between the photocurable material 10 and the projector 140. Herein, the transparent plate 150 is a plate that allows specified light to pass through and that has sufficient structural strength. In the present embodiment, the transparent plate 150 may be, for example, made of a glass material having a high ultraviolet light penetration rate. That is, in the present embodiment, the transparent plate 150 is a glass plate. However, a material of the transparent plate 150 is not limited to glass, and the transparent plate 150 may also be made of, for example, a light-transmission polymer material such as resin or plastic.

The heat dissipation assembly 130a in the present embodiment is disposed adjacent to the tank 110, so that the cooling fluid F provided by the heat dissipation assembly 130a may be directly blown to the printed object 20 inside the tank 110 to directly decrease the temperature of the printed object 20, thereby temporarily improving structural rigidity and strength of the printed object 20. Briefly, the three-dimensional printing apparatus 100a in the present embodiment may improve a printing success rate, and a product may have relatively high fineness.

A manufacturing method of the three-dimensional printing apparatus 100a includes the following steps: First, the tank 110 is provided to accommodate the photocurable material 10. Subsequently, the transparent plate 150 is disposed adjacent to the tank 110. The printing platform 120 is disposed on one side of the transparent plate 150. The projector 140 is disposed on the other side of the transparent plate 150. Then the heat dissipation assembly 130a is disposed adjacent to the tank 110 to complete manufacturing of the three-dimensional printing apparatus 100a.

It should be noted herein that the following embodiments continue to use the reference numerals and a part of the content of the foregoing embodiment. Same numbers are used for representing same or similar assemblies, and descriptions on same technical content are omitted. For the description about the omitted part, reference may be made to the foregoing embodiment, and description is not repeated in the following embodiment.

Figure 2A:
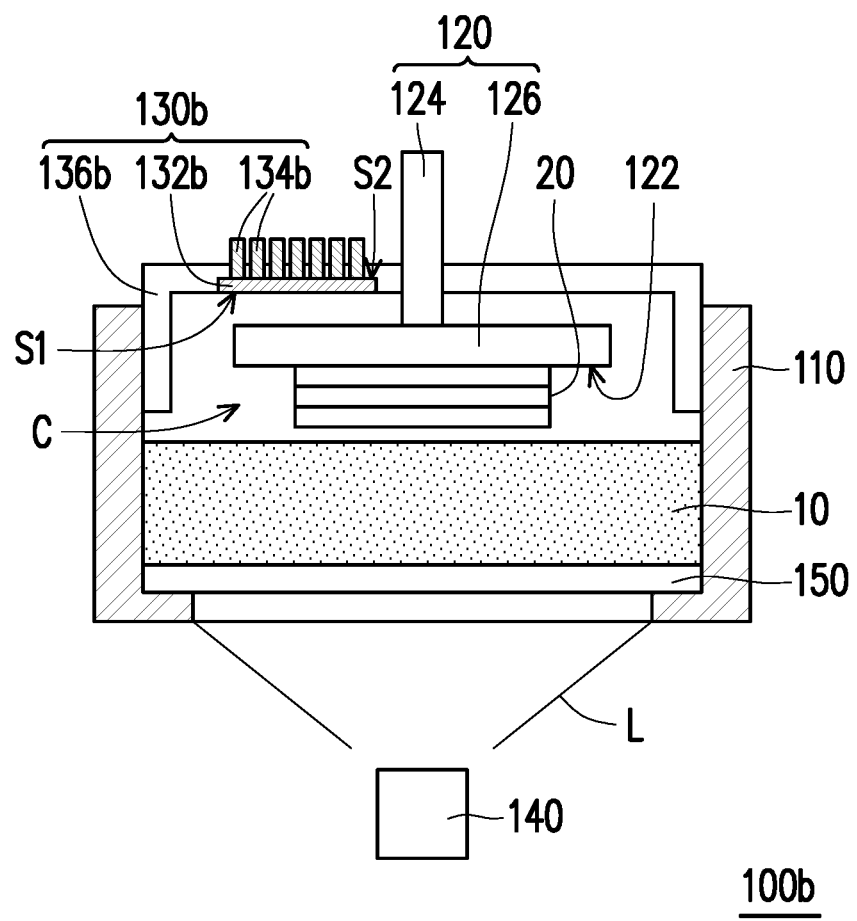
FIG. 2A is a schematic diagram of another three-dimensional printing apparatus according to an embodiment of the disclosure.
Figure 2B:
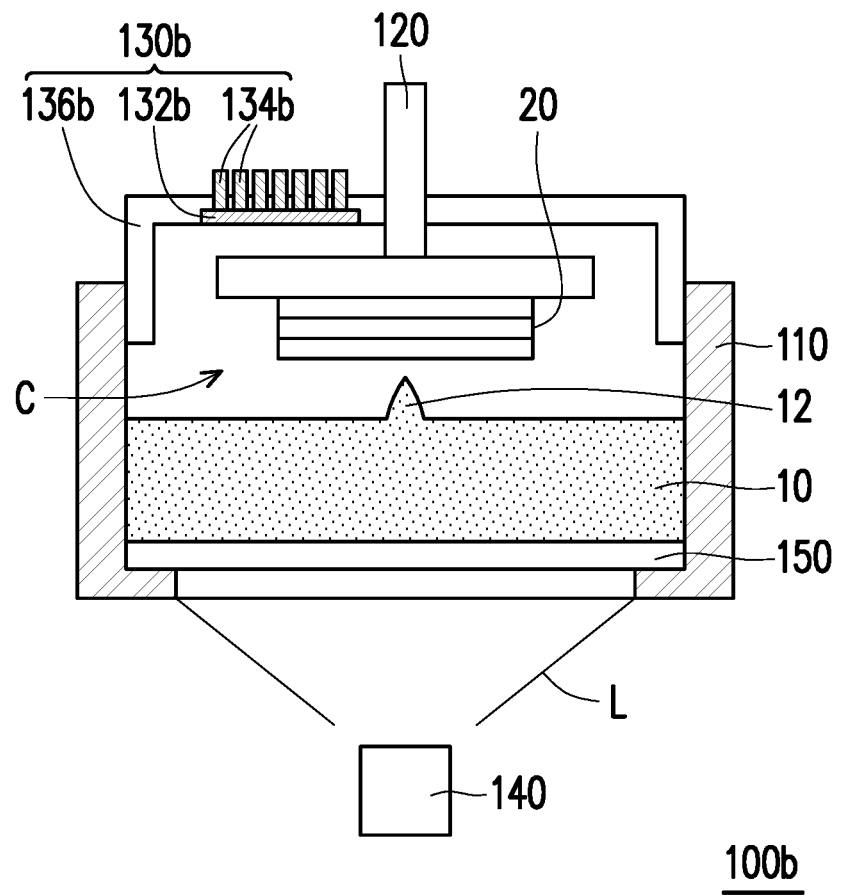
FIG. 2B is a schematic diagram of a photocurable material after printing of the three-dimensional printing apparatus in FIG. 2A.
Figure 2C:
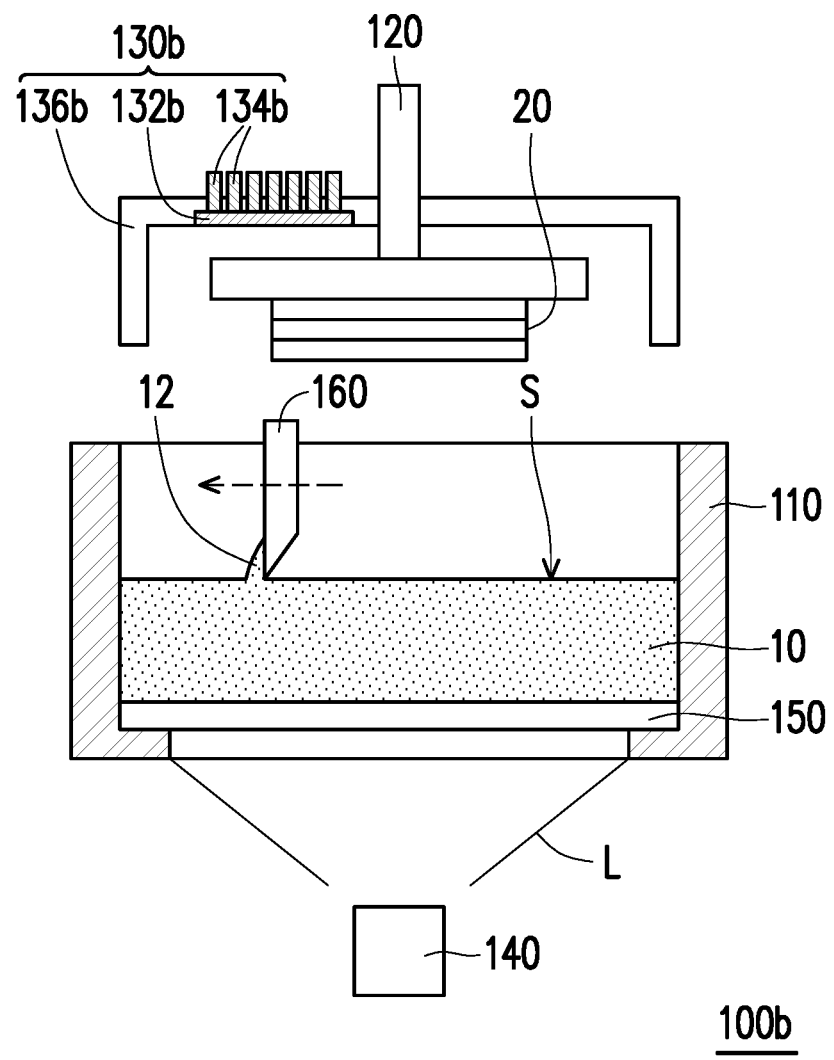
FIG. 2C is a schematic diagram of backfilling the uncured photocurable material in FIG. 2B by using a scraper.

FIG. 2A is a schematic diagram of another three-dimensional printing apparatus according to an embodiment of the disclosure. FIG. 2B is a schematic diagram of a photocurable material after printing of the three-dimensional printing apparatus in FIG. 2A. FIG. 2C is a schematic diagram of backfilling the uncured photocurable material in FIG. 2B by using a scraper. Referring to FIG. 1 and FIG. 2A, a three-dimensional printing apparatus 100b in the present embodiment is similar to the three-dimensional printing apparatus 100a in FIG. 1, and a difference lies in that: a heat dissipation assembly 130b in the present embodiment is disposed on the printing platform 120 to decrease a temperature of the printing platform 120.

Specifically, the heat dissipation assembly 130b in the present embodiment includes a thermoelectric cooling chip 132b, a heat dissipation fin 134b, and a cover plate 136b. The thermoelectric cooling chip 132b is provided with a cold surface S1 and a hot surface S2 that are opposite to each other. The heat dissipation fin 134b is disposed on the hot surface S2 of the thermoelectric cooling chip 132b. The cover plate 136b is disposed on a support frame 124 of the printing platform 120, and the thermoelectric cooling chip 132b is disposed on the cover plate 136b. Particularly, the cover plate 136b is adapted for defining a confined cooling chamber C with the tank 110, and a carrier board 126, which is connected to the support frame 124, of the printing platform 120 is located inside the cooling chamber C. The cold surface S1 of the thermoelectric cooling chip 132b is adapted to face the carrier board 126 of the printing platform 120, thereby controlling a temperature inside the cooling chamber C, so as to decrease a temperature of the printed object 20 located on a working surface 122 of the carrier board 126. In other words, the temperature inside the cooling chamber C may be decreased by using the cold surface S1 of the thermoelectric cooling chip 132b and the heat dissipation fin 134b disposed on the thermoelectric cooling chip 132b, so as to indirectly decrease the temperature of the printed object 20 attached on the working surface 122.

Referring to FIG. 2B and FIG. 2C, because the temperature inside the cooling chamber C is decreased through control of the thermoelectric cooling chip 132b, viscosity of an uncured (namely, unreacted) photocurable material 12 is improved, and it is difficult to backfill the photocurable material 12. Therefore, the three-dimensional printing apparatus 100b in the present embodiment further includes a scraper 160 to backfill the uncured photocurable material 12. In an embodiment, the photocurable material 10 is provided with a flat surface S, thereby facilitating the subsequent printing and listing procedure, but is not limited thereto.

The heat dissipation assembly 130b in the present embodiment is disposed on the printing platform 120, so that the heat dissipation assembly 130b may control the temperature inside the cooling chamber C to indirectly decrease the temperature of the printed object 20, thereby temporarily improving structural rigidity and strength of the printed object 20, so as to withstand stress generated during a printing process. The three-dimensional printing apparatus 100b in the present embodiment may improve a printing success rate, and a product may have relatively high fineness.

Figure 3:
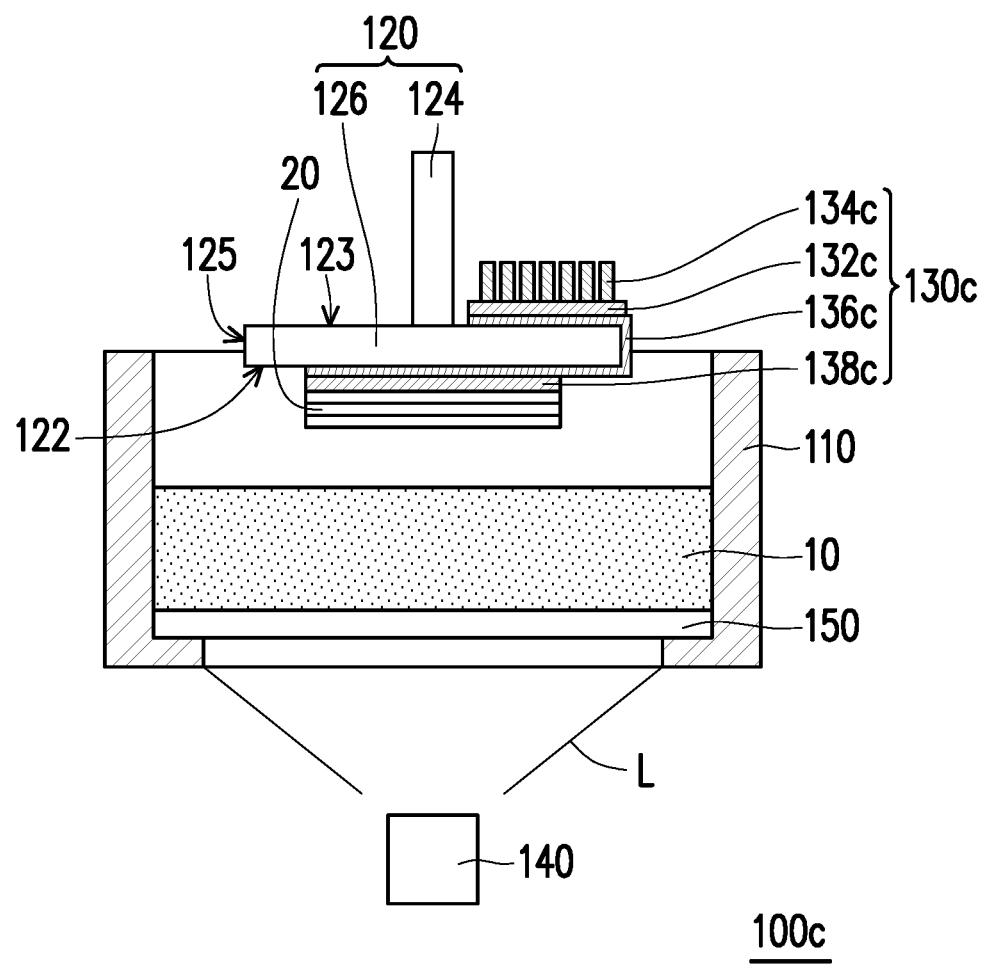
FIG. 3 is a schematic diagram of another three-dimensional printing apparatus according to an embodiment of the disclosure.

FIG. 3 is a schematic diagram of another three-dimensional printing apparatus according to an embodiment of the disclosure. Referring to FIG. 1 and FIG. 3, a three-dimensional printing apparatus 100c in the present embodiment is similar to the three-dimensional printing apparatus 100a in FIG. 1, and a difference lies in that: a heat dissipation assembly 130c in the present embodiment is disposed on the printing platform 120 to decrease a temperature of the printing platform 120.

Specifically, the heat dissipation assembly 130c in the present embodiment includes a thermoelectric cooling chip 132c, a heat dissipation fin 134c, a heat pipe 136c, and a heat dissipation plate 138c. The thermoelectric cooling chip 132c is provided with a cold surface S1 and a hot surface S2 that are opposite to each other. The cold surface S1 of the thermoelectric cooling chip 132c faces a carrier board 126 of the printing platform 120 to decrease a temperature of a printed object 20 located on a working surface 122 of the carrier board 126. The heat dissipation fin 134c is disposed on the hot surface S2 of the thermoelectric cooling chip 132c. The heat pipe 136c is disposed on the carrier board 126 of the printing platform 120. The carrier board 126 is provided with an upper surface 123 and a working surface 122 that are opposite to each other and a side surface 125 connecting the upper surface 123 and the working surface 122. The heat pipe 136c directly covers a part of the upper surface 123, a part of the working surface 122 and a part of the side surface 125. The heat dissipation plate 138c is disposed on the carrier board 126 of the printing platform 120. A part of the heat pipe 136c is located between the working surface 122 and the heat dissipation plate 138c. In other words, the temperature of the printed object 20 may be decreased in sequence by using the heat dissipation plate 138c, the heat pipe 136c, the thermoelectric cooling chip 132c, and the heat dissipation fin 134c that are disposed on the printing platform 120.

The heat dissipation assembly 130c in the present embodiment is disposed on the printing platform 120, so that the heat dissipation assembly 130c may indirectly decrease the temperature of the printed object 20, thereby temporarily improving structural rigidity and strength of the printed object 20, so as to withstand stress generated during a printing process. The three-dimensional printing apparatus 100c in the present embodiment may improve a printing success rate, and a product may have relatively high fineness.

Based on the above, in the design of the three-dimensional printing apparatus in the embodiments of the disclosure, a heat dissipation assembly is disposed corresponding to a printed object or disposed on a printing platform, and may directly or indirectly decrease a temperature of the printed object, so that structural rigidity and strength of the printed object may be temporarily improved to withstand stress generated during a printing process, thereby improving a success rate and fineness of a product.

Although the disclosure has been disclosed by using the above embodiments, the embodiments are not intended to limit the disclosure. Any person of ordinary skill in the art may make variations and improvements without departing from the spirit and scope of the disclosure. Therefore, the protection scope of the disclosure should be subject to the appended claims.

What is claimed is:

1. A three-dimensional printing apparatus, comprising:
   a tank, for accommodating a photocurable material;
   a transparent plate, disposed adjacent to the tank;
   a printing platform, disposed on one side of the transparent plate;
   a projector, disposed on the other side of the transparent plate; and
   a wind pipe, disposed adjacent to the tank and for directly providing a cold air to a printed object.

2. The three-dimensional printing apparatus according to claim 1, wherein the projector is adapted for providing a curing light beam to irradiate the photocurable material, so that the photocurable material is cured to be the printed object on a working surface of the printing platform.

3. The three-dimensional printing apparatus according to claim 1, wherein the transparent plate is outside the tank, or the tank has the transparent plate as a bottom portion.

4. The three-dimensional printing apparatus according to claim 1, wherein forms of the photocurable material comprise a liquid state, a colloidal state, or powder.

5. The three-dimensional printing apparatus according to claim 1, wherein the projector comprises a digital light processing (DLP) projection assembly, a liquid-crystal-on-silicon (LCOS) projection assembly, a liquid crystal projection assembly, or a scanning-type laser projection assembly.

6. The three-dimensional printing apparatus according to claim 1, wherein a material of the transparent plate comprises glass or a polymer material.

7. The three-dimensional printing apparatus according to claim 1, wherein the projector is adapted for providing a curing light beam to irradiate the photocurable material, so that the photocurable material is cured to be the printed object formed on a working surface of the printing platform.

8. The three-dimensional printing apparatus according to claim 1, wherein the cold air is provided for reducing a temperature of the printed object and strengthening a structural rigidity of the printed object.

9. A three-dimensional printing apparatus, comprising:
   a tank, for accommodating a photocurable material;
   a transparent plate, disposed adjacent to the tank;
   a printing platform, disposed on one side of the transparent plate;
   a projector, disposed on the other side of the transparent plate; and
   a heat dissipation assembly, disposed adjacent to the tank and for directly providing a cooling fluid to a printed object to reduce a temperature of the printed object and strengthen a structural rigidity of the printed object.

* * * * *